May 12, 1959     J. N. KOTANCHIK ET AL     2,885,888

LOADING UNIT FOR A COMBINED LOAD TESTING MACHINE

Filed April 25, 1956     4 Sheets-Sheet 1

INVENTORS
JOSEPH N. KOTANCHIK
NORRIS F. DOW

BY

*R. I. Tompkins*

ATTORNEYS

May 12, 1959   J. N. KOTANCHIK ET AL   2,885,888
LOADING UNIT FOR A COMBINED LOAD TESTING MACHINE
Filed April 25, 1956   4 Sheets-Sheet 2

INVENTORS
JOSEPH N. KOTANCHIK
NORRIS F. DOW

BY
ATTORNEYS

INVENTORS
JOSEPH N. KOTANCHIK
NORRIS F. DOW

May 12, 1959     J. N. KOTANCHIK ET AL     2,885,888
LOADING UNIT FOR A COMBINED LOAD TESTING MACHINE
Filed April 25, 1956     4 Sheets-Sheet 4

INVENTORS
JOSEPH N. KOTANCHIK
NORRIS F. DOW

BY

ATTORNEYS

2,885,888

LOADING UNIT FOR A COMBINED LOAD TESTING MACHINE

Joseph N. Kotanchik, Warwick, Va., and Norris F. Dow, Schenectady, N.Y., assignors to the United States of America as represented by the Secretary of the Navy Application April 25, 1956, Serial No. 580,671

9 Claims. (Cl. 73—93)

(Granted under Title 35, U.S. Code (1952), sec. 266)

The invention described herein may be manufactured and used by or for the Government of the United States of America for governmental purposes wtihout the payment of any royalties thereon or therefor.

The present invention relates to a loading unit for a combined load testing machine and more particularly to a loading unit which is capable of subjecting a specimen to either tension or compression loading, and at the same time to a torsional load.

An object of the present invention is to provide an apparatus to apply a torque to act about the longitudinal axis of a shaft which is independent of motion of the shaft in the direction of its longitudinal axis.

Another object of the invention is to provide a loading unit for a load testing machine wherein the loading in either tension or compression and the loading in torsion may be applied independently or jointly, through easily controllable hydraulic means.

A further object of the invention is the provision of a combined load testing machine loading unit which will be relatively free of any sticking friction.

Figure 1:
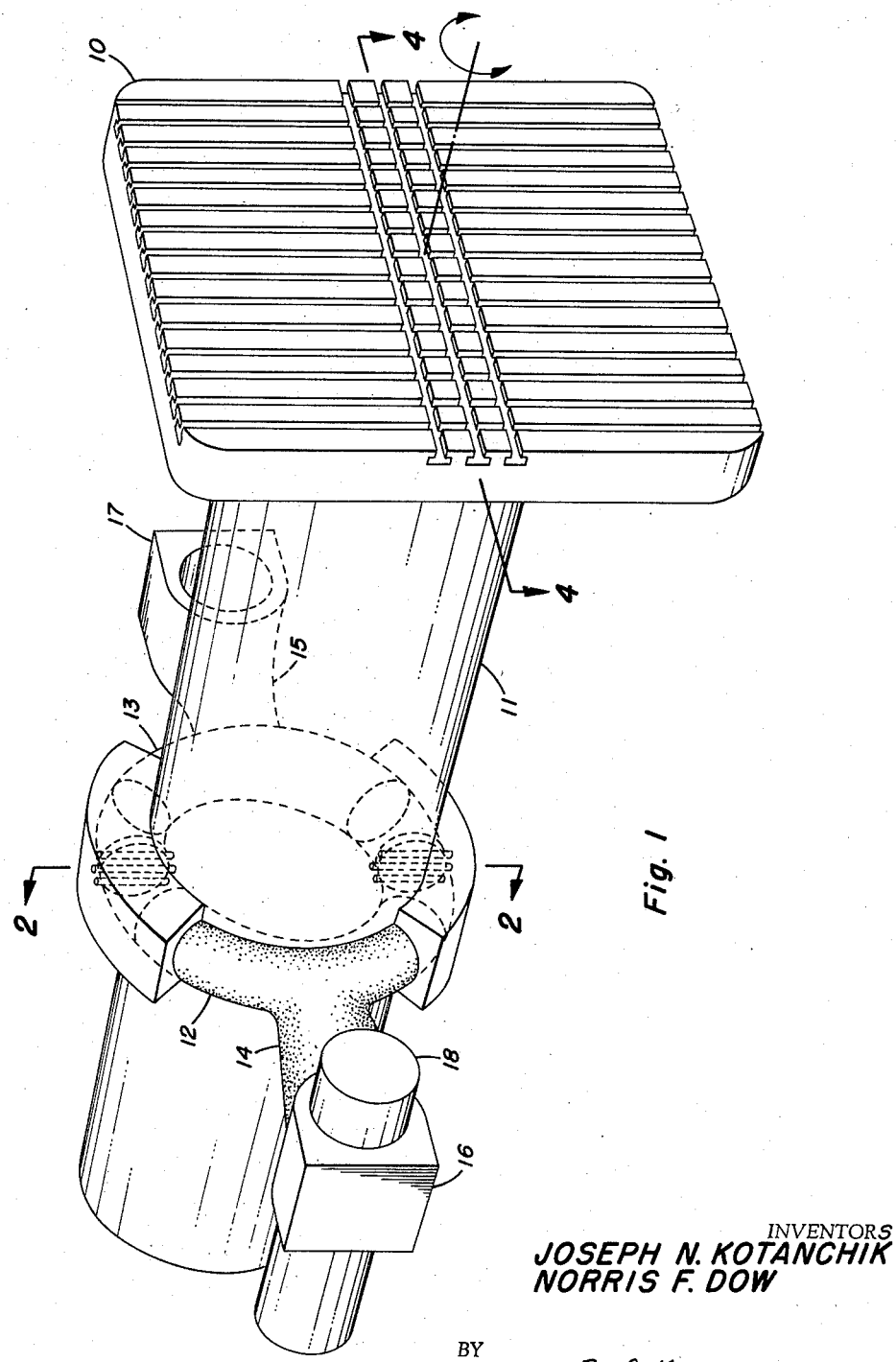
Figure 2:
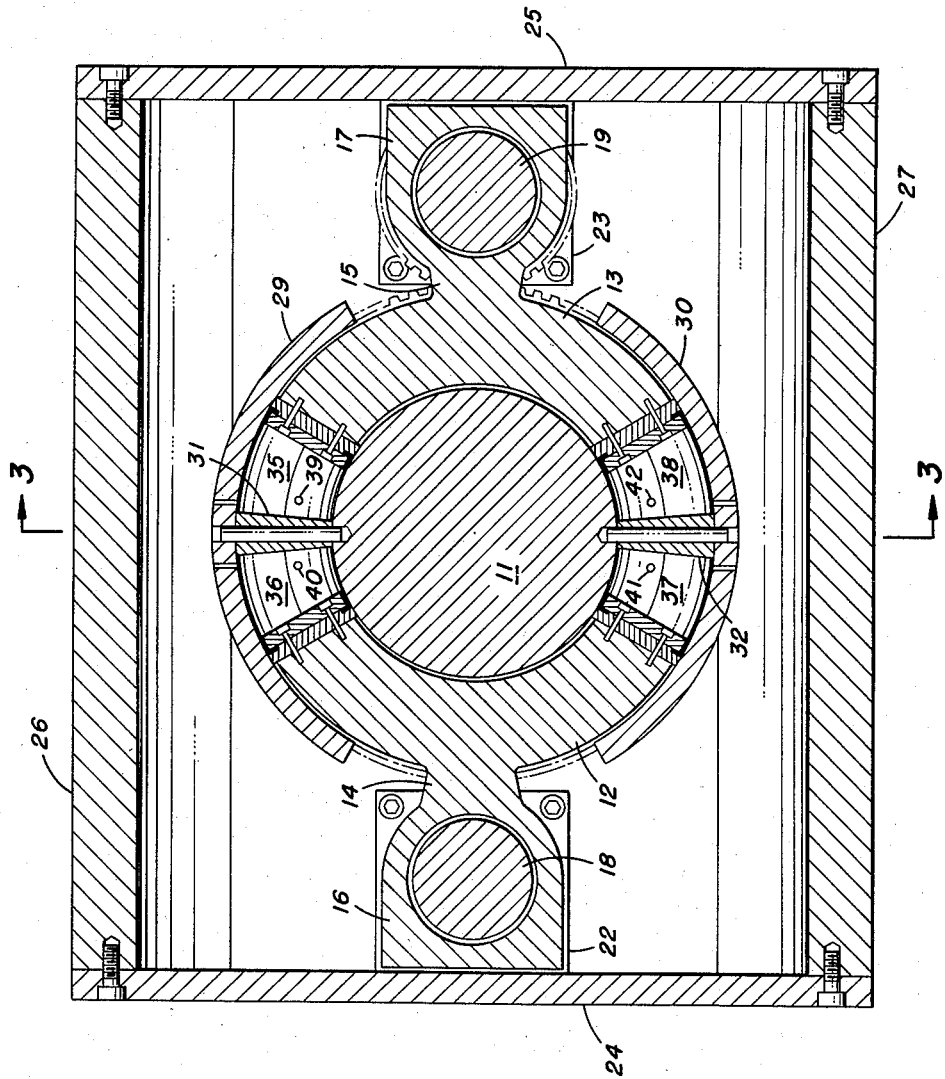
Figure 3:
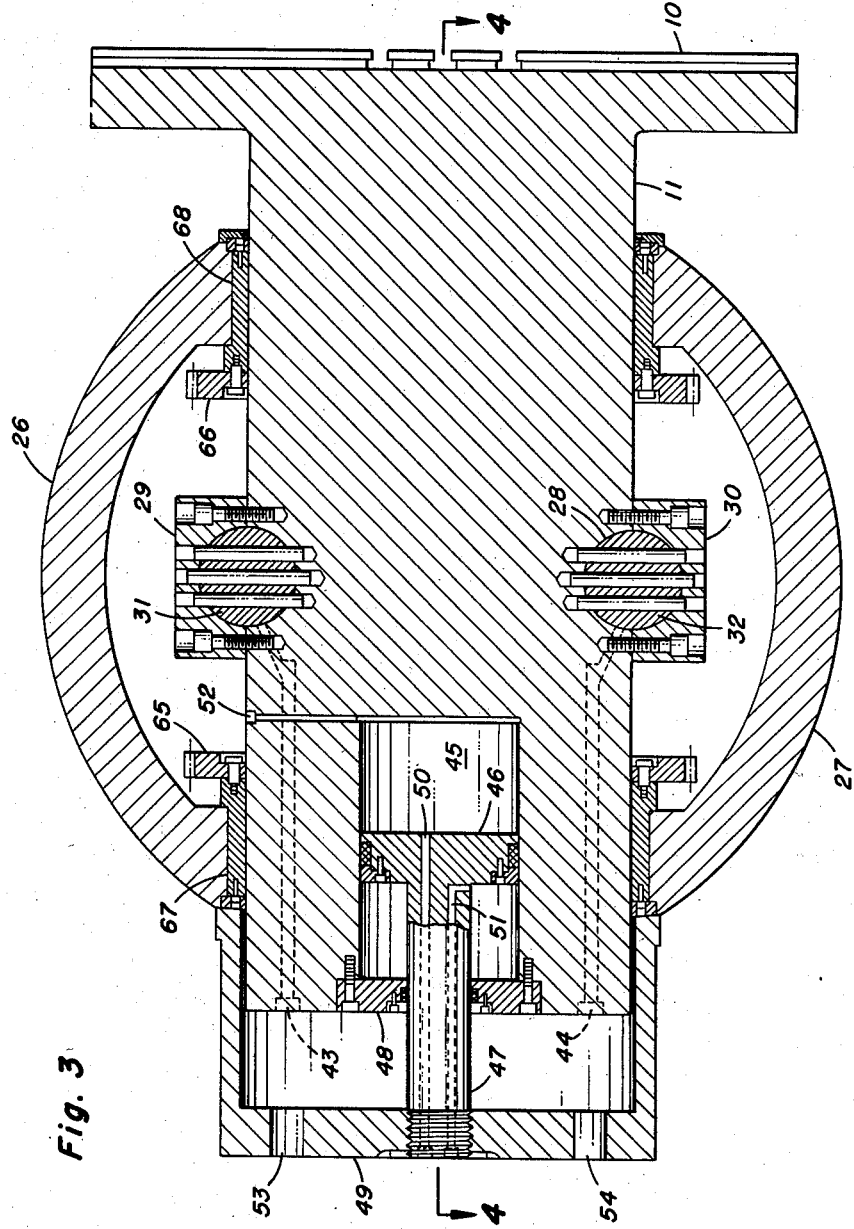
Figure 4:
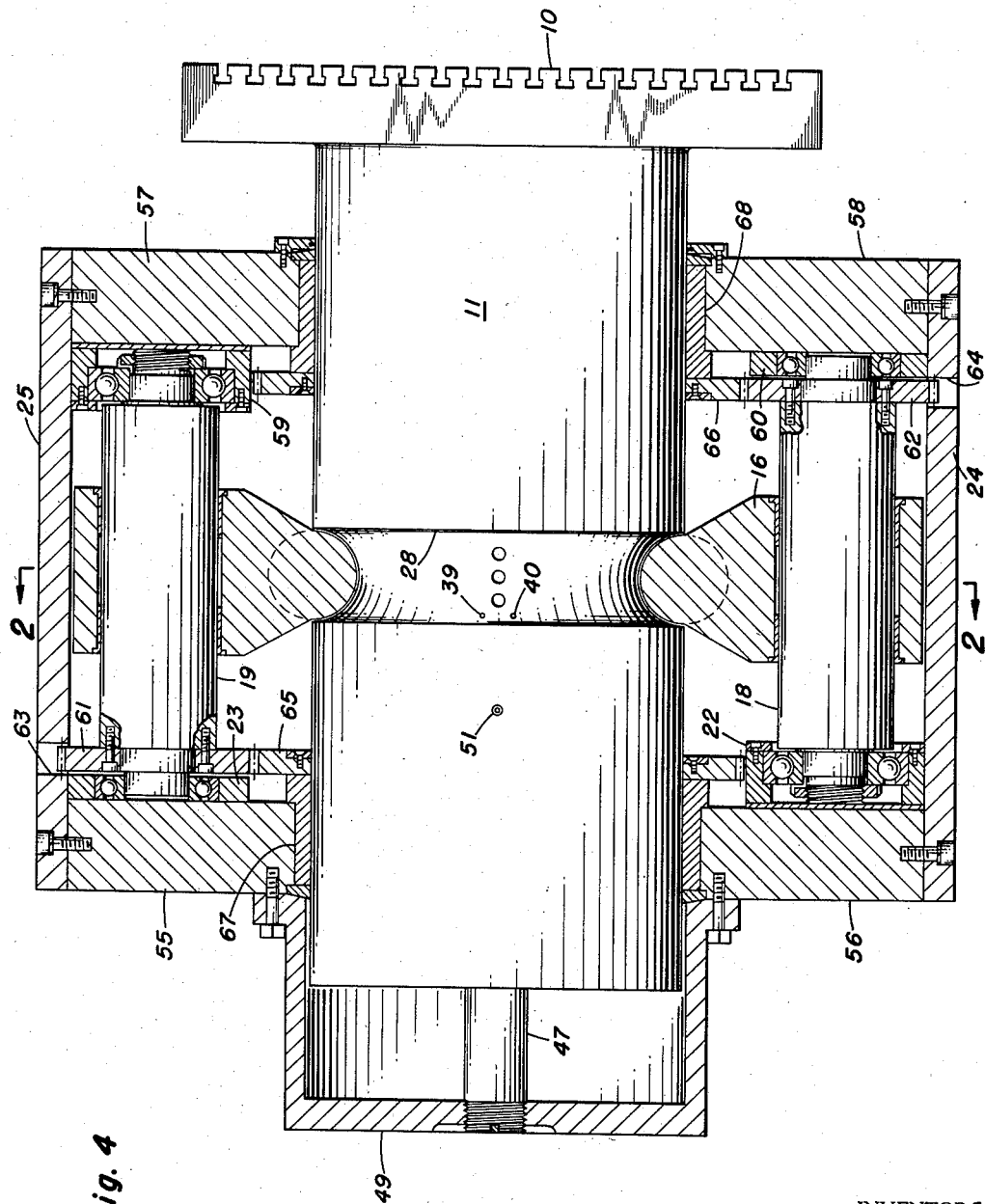

Other objects and many of the attendant advantages of this invention will be readily appreciated as the same becomes better understood by reference to the following detailed description when considered in connection with the accompanying drawings wherein:

Fig. 1 is a perspective view of a loading unit for a combined load testing machine according to the invention, with parts removed, Fig. 2 is a cross-sectional view taken on the line 2—2 of Fig. 1, Fig. 3 is a cross-sectional view taken on the line 3—3 of Fig. 2, and Fig. 4 is a cross-sectional view taken on the line 4—4 of Figs. 1 and 3.

Referring now to the drawings, wherein like reference characters designate like or corresponding parts throughout the several views, there is shown in Fig. 1 a specimen attachment plate 10 which is secured to and moves with a main loading member 11. Member 11 is rotatable in the toroidal segments 12 and 13 which extend about the periphery of the member 11, in a fashion to be described in detail hereinafter. The segments 12 and 13 have integrally formed therewith, respectively, carrier bars 14 and 15. The carrier bars are in turn supported by sleeves 16 and 17 on guide and support shafts 18 and 19, only shaft 18 being shown in Fig. 1. From the above description it may be seen that the entire structure shown in Fig. 1, with the exception of shaft 18, may be moved longitudinally to apply tension or compression to a specimen, and that attachment plate 10 and member 11 may be rotated to apply torsion to the same test specimen, and at the same time.

Referring now to Fig. 2, there may be seen the loading member 11, the segments 12 and 13 thereabout, the segments 12 and 13 being supported and guided by the carrier bars 14 and 15, the sleeve members 16 and 17 and the shafts 18 and 19. The shaft 18 is carried by a plate 22, and the shaft 19 is carried by a plate 23. The plates 22 and 23 are in turn carried by a housing the side walls 24 and 25 of which are shown in Fig. 2, as well as the top wall 26 and floor 27.

As is best seen in Figs. 3 and 4, the member 11 has a groove 28 extending circumferentially thereabout, groove 28 being semicircular in cross-section. The segments 12 and 13 are positioned in the groove 28. A pair of toroidal chambers is formed by means of a toroidal housing 29 encompassing the upper part of the segments 12 and 13, and a toroidal housing 30 encompassing the lower parts of the segments 12 and 13. Housings 29 and 30 are connected to member 11 by screws, or other suitable connecting means. A circular divider plate 31 is firmly attached to member 11 and to housing 29, as by means of the three dowels shown in Fig. 3. Similarly, circular divider plate 32 is firmly fixed to housing 30, also by three dowel pins. Each of the ends of the segments 12 and 13 carries suitable packing means, as shown. Thus, there are formed four expansible chambers: a first expansible chamber 35 is formed between housing 29, member 11, circular plate 31 and the upper part of segment 13; a second expansible chamber 36 is formed between member 11, housing 29, circular plate 31 and the upper part of segment 12; a third expansible chamber 37 is formed between member 11, housing 30, a circular plate 32, and the lower part of segment 12; a fourth expansible chamber 38 is formed between member 11, housing 30, circular plate 32 and the lower part of segment 13. Each of the expansible chambers has a fluid supply port therein, the ports being designated 39, 40, 41, and 42. Also, there is an air bleed passage provided into each of the expansible chambers through the housings 29 and 30. It will thus be seen that if fluid under pressure is supplied through the ports 40 and 42 to the expansible chambers 36 and 38, and simultaneously fluid is permitted to exhaust from chambers 35 and 37 through the ports 39 and 41, that the member 11 will be caused to rotate in a clockwise direction, as seen in Fig. 2, and that the circular plates 31 and 32 and the housings 29 and 30 will also move in a clockwise direction with member 11, since these latter mentioned parts are affixed to the member 11. It will be understood that during such movement, there may or may not be relative longitudinal motion between the sleeves 16 and 17 on the one hand and the shafts 18 and 19 on the other hand.

Referring now to Fig. 3 there may be seen in more detail the means by which fluid is supplied to the expansible chambers. These means constitute drill passages 43 and 44 extending longitudinally of member 11 and terminating in the rear surface thereof. There is also shown in Fig. 3 the means by which axial movement is imparted to the member 11. As may be seen therein, member 11 has a chamber 45 in the end thereof opposite to specimen attachment plate 10. Within chamber 45 there is a piston 46 having a piston rod 47 which extends through a closure plate 48 for the chamber 45. Piston rod 47 is attached, by screw threads or other suitable means, to a back plate 49. A first passage 50 extends longitudinally of the piston 46 and piston rod 47, and completely therethrough, and a second passage 51 extends through the piston rod 47 and terminates on the opposite side of the piston 46 from the passage 50. A suitable air bleed 52 is provided for the chamber 45. It may thus be seen that the furnishing of liquid through the passage 51 will cause the member 11 to move to the left, as seen in Fig. 3, and thus the loading unit will apply tension to a test specimen attached to the plate 10; conversely if liquid is supplied through the passage 50, the member 11 will be caused to move to the right, thus applying compression to a specimen held by attachment plate 10.

There are also shown in the back plate 49, a pair of openings 53 and 54; these openings preferably extend in an arc, and are to permit the passage of conduit means to be connected to the passages 43 and 44, respectively.

In Fig. 4, there is shown a back plate 55 to which is attached the side plate 25 and back plate 49. A second back plate 56 has attached thereto the side plate 24 and back plate 49. Side plate 25 is attached at its front end to front plate 57, and side plate 24 is attached to its front end to front plate 58. The plates 55 and 56 may be integral with each other, as may be the plates 57 and 58; also these plates may be integral with the top plate 26 and/or the floor 27. The back plate 55 carries the plate 23 (see Fig. 2), and the plate 23 in turn supports a ball bearing in which is journalled the back end of the shaft 19. The front end of shaft 19 is supported in bearings carried by a plate 59 mounted on the front plate 57. Secured to the back end of the shaft 19 is a gear 61 which extends partially through a slit 63 in the plate 25, where it may be engaged by another gear (not shown) which may impart rotational movement to the gear 61 and the shaft 19.

A similar construction supports the shaft 18, there being shown affixed to the back plate 56 the plate 22 carrying a bearing which supports the rear end of shaft 18. The front end of shaft 18 is supported in a bearing which is supported in a plate 60 attached to front plate 58. The front end of shaft 18 has a gear 62 fixed thereto and extending through a slot 64 in side plate 24.

Gear 61 meshes with a ring gear 65 which encompasses member 11, but which is not fixed thereto. Ring gear 65 is fixed to a sleeve bearing 67 which is rotatable in the back plates 55 and 56, which, as previously noted, may be integral. Similarly, gear 62 meshes with a ring gear 66 which is fixed to sleeve bearing 68, which latter is rotatable in the front plates 57 and 58. It will be understood that by meshing a gear, not shown, with the gear 61, shaft 19 may be caused to rotate in a constant manner to avoid any sticking resulting from friction, and also the ring gear 65 will cause the sleeve bearing 67 to rotate within the plates 55 and 56 and about member 11 to prevent any sticking of member 11 at its rear end. In like fashion a gear may be made to cause the gear 62 to rotate, thus to rotate the shaft 18 and also to rotate the ring gear 66 and sleeve bearing 68 to avoid sticking friction between the sleeve 16 and the shaft 18 on one hand, and the sleeve bearing 68 and the member 11 on the other hand. Preferably, the sleeve bearings 67 and 68 are caused to rotate at equal rotational velocities, but in opposite directions.

From the above description it will be seen that torsional forces may be applied to a specimen carried by the specimen attachment plate 10 by means of the expansible chambers 35, 36, 37 and 38, that tension or compression forces may be applied to such a specimen by means of the piston 46 operating in the chamber 45 at the rear of the member 11, and that frictional sticking forces may be reduced or eliminated by the rotation of shafts 18 and 19 and the sleeve bearings 67 and 68.

It will be understood that the housing may be mounted in a fixed position, or secured to a movable mount, as desired.

Obviously many modifications and variations of the present invention are possible in the light of the above teachings. It is therefore to be understood that within the scope of the appended claims the invention may be practiced otherwise than as specifically described.

We claim:
1. In a loading unit for a combined load testing machine, a specimen attachment plate, a member for supporting said specimen attachment plate, said member being circular in cross-section and having a semicircular groove extending thereabout, a pair of toroidal segments in said groove, opposed ends of said segments terminating in spaced relation, a housing affixed to said member and overlying at least one part of said groove, said housing being semicircular in internal cross-section and forming with said groove a toroidal chamber, a divider plate attached to said housing and to said member, said divider plate dividing said chamber into two parts, and means to admit fluid to either of said chambers, whereby said member, said divider plate and said housing will rotate about the longitudinal axis of said member under the influence of fluid pressure acting against the end of one of said arms and said divider plate.

2. A loading unit for a combined load testing machine comprising a housing, a cylindrical member for holding a test specimen in said housing, said member being rotatable and translatable in said housing, a toroidal chamber having one wall thereof fixed to said member, a toroidal segment in said chamber, means fixing said segment to said housing against rotation, and means to supply fluid under pressure to said toroidal chamber, whereby to rotate said cylindrical member.

3. A loading unit for a combined load testing machine comprising a housing, a cylindrical member for holding a test specimen, said member being rotatably and translatably mounted in said housing, a semicircular groove in said member and circumferentially thereof, a toroidal housing overlying said groove and forming therewith a toroidal chamber, a circular divider plate in said chamber dividing said chamber into two parts, said plate being fixed to said toroidal housing and to said member, a toroidal segment slidable relative to said chamber, means fixing said segment in said housing against rotational movement, and means to supply fluid under pressure to either side of said divider plate, whereby to cause said member to rotate in said housing.

4. The apparatus of claim 3, and means to cause said member to translate in said housing.

5. The apparatus of claim 3, the means fixing said segment in said housing comprising a shaft carried by said housing laterally of said member, a sleeve on said shaft, said sleeve being fixedly attached to said segment.

6. The apparatus of claim 4, and means to cause said member to translate in said housing.

7. A loading unit for a combined load testing machine comprising a housing having spaced front and rear walls, alined circular openings in said walls, a sleeve bearing in each of said openings, a cylindrical member for holding a test specimen journalled in said sleeve bearings, a semicircular groove in said member and circumferentially thereof, said groove being intermediate said walls, a pair of oppositely disposed toroidal housings overlying said groove and forming therewith a pair of toroidal chamber, a circular divider plate in each of said chambers dividing each of said chambers into two parts, each of said plates being fixed to one of said toroidal housings and to said member, a pair of toroidal segments slidable relative to said chamber, each of said segments having a portion thereof in each of said chambers, a pair of shafts in said housing parallel to said member and laterally thereof, said shafts extending between said front and rear walls and rotatably supported thereby, a sleeve slidably mounted on each of said shafts, means fixedly connecting one of said sleeves to one of said segments and means fixedly connecting the other of said sleeves to the other of said segments, first and second ring gears connected to said front and rear sleeve bearings, respectively, a first gear connected to one of said shafts and meshing with said first ring gear, a second gear connected with the other of said shafts and meshing with said second ring gear, said first and second gears being adapted to be driven whereby to rotate said shafts and said sleeve bearings, and means to supply fluid under pressure to corresponding sides of each of said divider plates, whereby to rotate said member.

8. The apparatus of claim 7, and means to cause said member to translate in said sleeve bearings.

9. The apparatus of claim 7, said member having a chamber in one end thereof, a piston in said chamber, a piston rod on said piston, means fixing said piston rod relative to said back plate, and means to supply fluid under pressure to either side of said piston to cause said member to translate.

References Cited in the file of this patent

UNITED STATES PATENTS

| | | |
|---|---|---|
| 2,586,708 | Petit | Feb. 19, 1952 |
| 2,712,756 | Greer et al. | July 12, 1955 |

FOREIGN PATENTS

| | | |
|---|---|---|
| 96,334 | Germany | Feb. 25, 1898 |
| 534,157 | Germany | Sept. 23, 1931 |